United States Patent
Tachibana

(10) Patent No.: US 12,149,929 B2
(45) Date of Patent: Nov. 19, 2024

(54) COMMUNICATION APPARATUS, CONTROL METHOD, AND STORAGE MEDIUM

(71) Applicant: CANON KABUSHIKI KAISHA, Tokyo (JP)

(72) Inventor: Hideaki Tachibana, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 17/327,130

(22) Filed: May 21, 2021

(65) Prior Publication Data

US 2021/0282011 A1 Sep. 9, 2021

Related U.S. Application Data

(63) Continuation of application No. PCT/JP2019/044557, filed on Nov. 13, 2019.

(30) Foreign Application Priority Data

Nov. 27, 2018 (JP) .................................. 2018-220908

(51) Int. Cl.
| | |
|---|---|
| H04L 29/00 | (2006.01) |
| H04W 12/0431 | (2021.01) |
| H04W 12/06 | (2021.01) |
| H04W 12/30 | (2021.01) |

(52) U.S. Cl.
CPC ....... H04W 12/06 (2013.01); H04W 12/0431 (2021.01); H04W 12/35 (2021.01)

(58) Field of Classification Search
CPC . H04W 12/0431; H04W 12/06; H04W 12/35; H04L 63/08; H04L 63/0823; H04L 63/083
See application file for complete search history.

(56) References Cited

U.S. PATENT DOCUMENTS

| | | | | |
|---|---|---|---|---|
| 2016/0234758 A1* | 8/2016 | Qi | ........................ | H04W 48/14 |
| 2017/0041977 A1* | 2/2017 | Yokoyama | ............. | H04N 1/327 |
| 2017/0078969 A1* | 3/2017 | Yamaura | ............... | H04W 76/14 |
| 2017/0295448 A1 | 10/2017 | McCann et al. | | |
| 2018/0034690 A1* | 2/2018 | Sivarajan | ................ | H04W 4/50 |
| 2019/0306919 A1* | 10/2019 | Miyake | ................. | G06F 3/1292 |

FOREIGN PATENT DOCUMENTS

| | | |
|---|---|---|
| JP | 2013-038498 A | 2/2013 |
| JP | 2015-220604 A | 12/2015 |
| JP | 2018-129770 A | 8/2018 |

OTHER PUBLICATIONS

Device Provisioning Protocol Specification Version 1.0, Wi-Fi Alliance, Apr. 2018, (Retrieved from internet: http://www.wi-fi.org/download.php?file=/sites/default/files/private/Device_Provisioning_Protocol_Specification_v1.0.pdf).

Device Provisioning Protocol Specification Version 1.0, Wi-Fi Alliance, 2018.

* cited by examiner

Primary Examiner — Joseph P Hirl
Assistant Examiner — Chi D Nguy
(74) Attorney, Agent, or Firm — Canon U.S.A., Inc. IP Division

(57) ABSTRACT

In a case where a predetermined operation is received from a user, if a signal compliant with the DPP standard is received, a communication parameter sharing process is executed by a method compliant with the DPP standard, whereas if a signal compliant with another standard is received, the communication parameter sharing process is executed by a method compliant with the other standard.

19 Claims, 6 Drawing Sheets

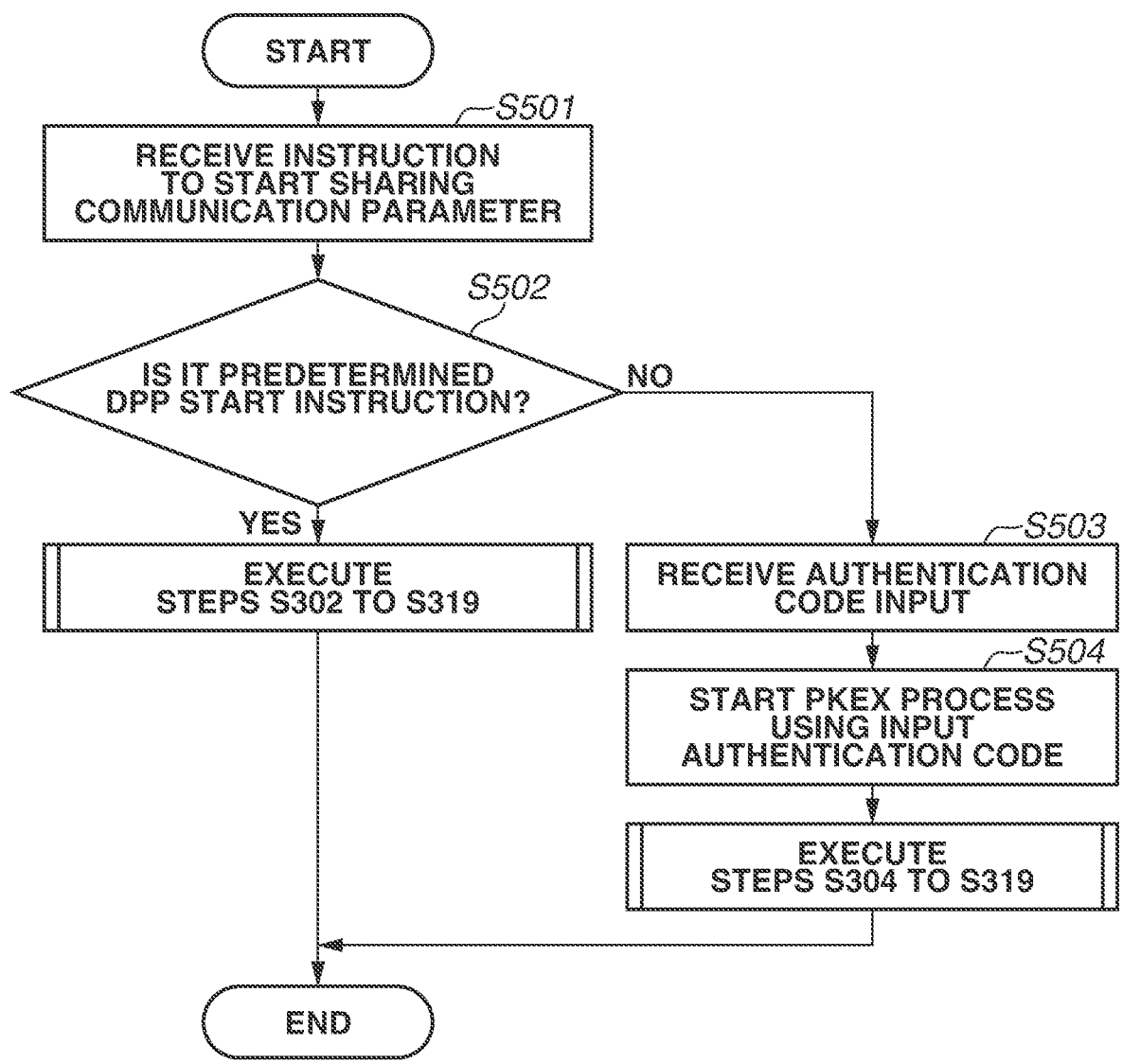

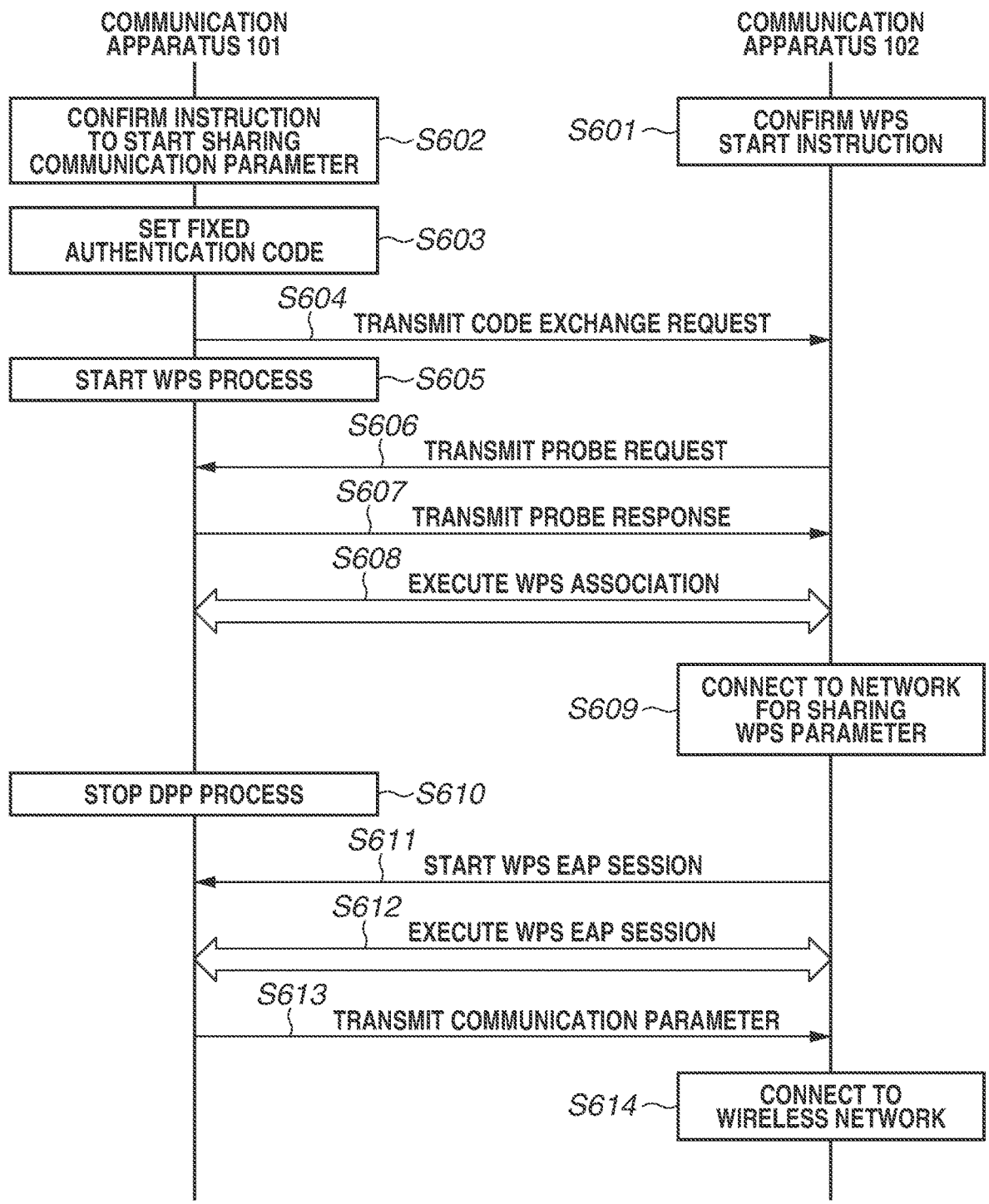

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2019/044557, filed Nov. 13, 2019, which claims the benefit of Japanese Patent Application No. 2018-220908, filed Nov. 27, 2018, both of which are hereby incorporated by reference herein in their entireties.

BACKGROUND OF THE INVENTION

Field of the Invention

The present invention relates to an apparatus that executes a communication parameter sharing process.

Background Art

In recent years, the Wi-Fi Device Provisioning Protocol (DPP) standard has been developed as a technique for sharing a communication parameter for access to a wireless network. The DPP standard specifies that an apparatus referred to as "configurator" provides a communication parameter to another apparatus referred to as "enrollee" (Patent Document 1).

There is the Wi-Fi Protected Setup (WPS) standard which is a communication parameter sharing standard different from the DPP standard. The WPS standard specifies that an apparatus referred to as "registrar" provides a communication parameter to another apparatus referred to as "enrollee".

In a case where an apparatus supports not only the DPP standard but also other communication parameter sharing standards, prompting a user to select which sharing standard is to be executed complicates user operations.

In view of the above-described issue, the present invention is directed to increasing user convenience of an apparatus capable of executing a communication parameter sharing process compliant with the DPP standard and another different sharing process.

CITATION LIST

Patent Literature

PTL 1: US2017-0295448

SUMMARY OF THE INVENTION

According to an aspect of the present invention, a communication apparatus includes a reception unit configured to receive a predetermined operation from a user, a first processing unit configured to execute a process of sharing a communication parameter for connecting to a wireless network with a first another communication apparatus in accordance with a first method compliant with a Wi-Fi Device Provisioning Protocol (DPP) standard, a second processing unit configured to execute a process of sharing a communication parameter for connecting to the wireless network with a second another communication apparatus in accordance with a second method compliant with another standard different from the DPP standard, and a control unit configured to control execution of the processes of sharing so that, in a case where the reception unit receives the predetermined operation, the process of sharing by the first processing unit is executed in a case where a first signal compliant with the DPP standard is received, and the process of sharing by the second processing unit is executed in a case where a second signal compliant with the other standard is received.

Further features of the present invention will become apparent from the following description of exemplary embodiments with reference to the attached drawings.

BRIEF DESCRIPTION OF THE DRAWINGS

FIG. 5 is a flowchart that is realized by the communication apparatus 101.

FIG. 6 is a diagram illustrating a sequence between the communication apparatuses 101 and 102.

DESCRIPTION OF THE EMBODIMENTS

Figure 1:
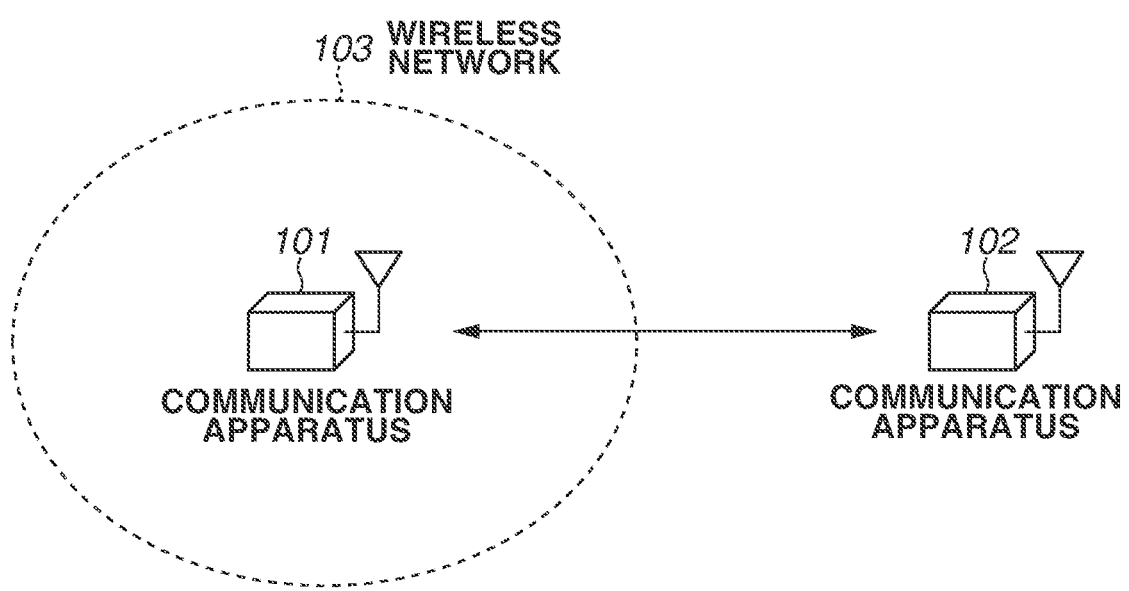
FIG. 1 is a diagram illustrating a configuration of a communication system.

FIG. 1 illustrates a configuration of a communication system according to an exemplary embodiment of the present invention.

A communication apparatus 101 operates as an access point that is a wireless base station, and establishes a wireless network 103. Specifically, the communication apparatus 101 periodically transmits a beacon containing information about the wireless network 103, receives a connection request from another communication apparatus, and permits the other communication apparatus to connect to the wireless network 103.

The communication apparatus 101 operates as a configurator based on the Device Provisioning Protocol (DPP) standard. The configurator is an apparatus that plays a role of providing a communication parameter for connecting to the wireless network 103. Specifically, the communication apparatus 101 provides a communication apparatus 102 with a communication parameter of the wireless network 103. The communication apparatus 101 also operates as a registrar compliant with the Wi-Fi Protected Setup (WPS) standard. The registrar is an apparatus that plays a role of providing a communication parameter for connecting to the wireless network 103, as in the configurator.

The communication parameter is, for example, credentials compliant with the DPP or WPS standard and contains information, such as netAccessKey which is key information for connecting to the wireless network 103. The communication parameter is not limited thereto and may contain information such as a pre-shared key as key information. The communication parameter may contain information about a service set identification (SSID) that is the identifier of the wireless network 103 and information about frequency channels. The communication parameter can contain information about an encryption method and an authentication method for use in the wireless network 103 and can contain an expiration date of the communication parameter.

The communication apparatus 101 serving as the configurator also provides a notification of role information in providing the communication parameter. The role information indicates a role after a communication parameter sharing process is executed. The role indicates either an access point that establishes a wireless network using the acquired communication parameter or a connection apparatus (hereinafter, referred to as "station") that connects to a wireless network using the acquired communication parameter. Since the communication apparatus 101 operates as an access point, the communication apparatus 101 provides a notification of role information indicating the access point.

By contrast, the communication apparatus 102 operates as a station that connects to a wireless network, and connects to the wireless network 103. The communication apparatus 102 operates as an enrollee compliant with each of the DPP and WPS standards. Specifically, the communication apparatus 102 acquires the communication parameter from the communication apparatus 101 and connects to the wireless network 103.

Hereinafter, a process as the configurator or as the enrollee compliant with the DPP standard will be referred to as "DPP process". Further, a process as the registrar or as the enrollee compliant with the WPS standard will be referred to as "WPS process". Specific examples of the communication apparatuses 101 and 102 include, but are not limited to, access points, mobile phones, digital cameras, video cameras, printers, projectors, personal computers (PCs), personal digital assistants (PDAs), smartphones, and smartwatches.

The wireless network 103 is a wireless network compliant with the Institute of Electrical and Electronics Engineers (IEEE) 802.11 series and is a network established by the communication apparatus 101. The wireless network 103 is not limited thereto and can be a network established by an access point other than the communication apparatuses 101 and 102. The wireless network 103 may be a network established by the communication apparatus 101 or another apparatus as a group owner compliant with the Wi-Fi Direct standard. The wireless network 103 may be a network compliant with wireless Universal Serial Bus (wireless USB), Multi Band Orthogonal Frequency Division Multiplexing Alliance (MBOA), Bluetooth®, ultra-wideband (UWB), ZigBee, and near field communication (NFC). UWB includes wireless USB, wireless 1394, and wireless networking (WINET).

Figure 2:
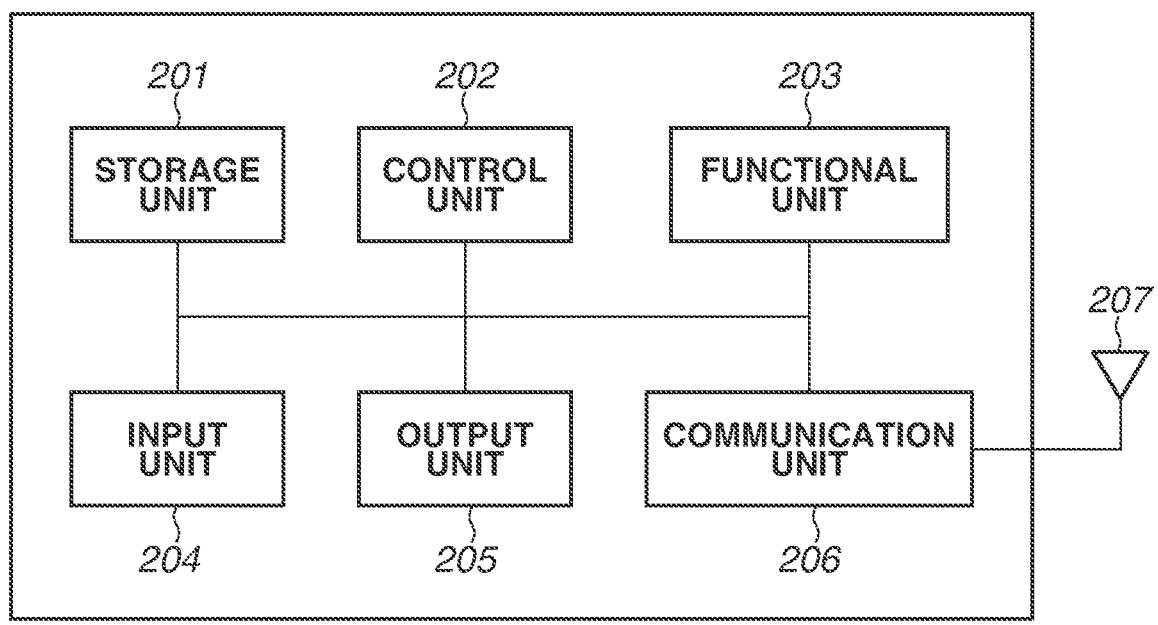
FIG. 2 is a diagram illustrating a hardware configuration of a communication apparatus 101.

FIG. 2 illustrates a hardware configuration of the communication apparatus 101. The communication apparatus 102 has a similar hardware configuration.

A storage unit 201 includes one or more memories, such as a read-only memory (ROM) and a random access memory (RAM). The storage unit 201 stores programs for execution of various operations described below and stores various types of information, such as the communication parameter for wireless communication. A storage medium such as a flexible disk, a hard disk, an optical disk, a magnetooptical disk, a compact disk ROM (CD-ROM), a compact disk recordable (CD-R), a magnetic tape, a non-volatile memory card, or a digital versatile DVD may be used as the storage unit 201 besides the memory such as a ROM or a RAM.

A control unit 202 includes one or more processors, such as a central processing unit (CPU) and a micro-processing unit (MPU), and comprehensively controls the communication apparatus 101 by executing a program stored in the storage unit 201. The control unit 202 may comprehensively control the communication apparatus 101 by cooperation with a program stored in the storage unit 201 and an operating system (OS). The control unit 202 can include a plurality of processors, such as multi-core processors, and the plurality of processors may comprehensively control the communication apparatus 101.

The control unit 202 controls a functional unit 203 to execute a predetermined process, such as an image capturing process, a printing process, and a projection process. The functional unit 203 is a hardware component for execution of the predetermined process by the communication apparatus 101. In a case where, for example, the communication apparatus 101 is a camera, the functional unit 203 is an image capturing unit and executes an image capturing process. In a case where, for example, the communication apparatus 101 is a printer, the functional unit 203 is a printing unit and executes a printing process. In a case where, for example, the communication apparatus 101 is a projector, the functional unit 203 is a projection unit and executes a projection process. Data to be processed by the functional unit 203 may be data stored in the storage unit 201 or data acquired through communication with another communication apparatus via a communication unit 206 described below.

An input unit 204 receives various user operations. An output unit 205 provides various types of output to a user. Herein, the output from the output unit 205 includes at least one of a display on a screen, an audio output from a speaker, and a vibration output. The input unit 204 and the output unit 205 may be realized with a single module, such as a touch panel.

The communication unit 206 controls wireless communication and Internet Protocol (IP) communication compliant with the IEEE 802.11 series. The communication unit 206 controls an antenna 207 to transmit and receive wireless signals for wireless communication. The communication apparatus 101 communicates content such as image data, document data, and video image data to the communication apparatus 102 via the communication unit 206.

Figure 3:
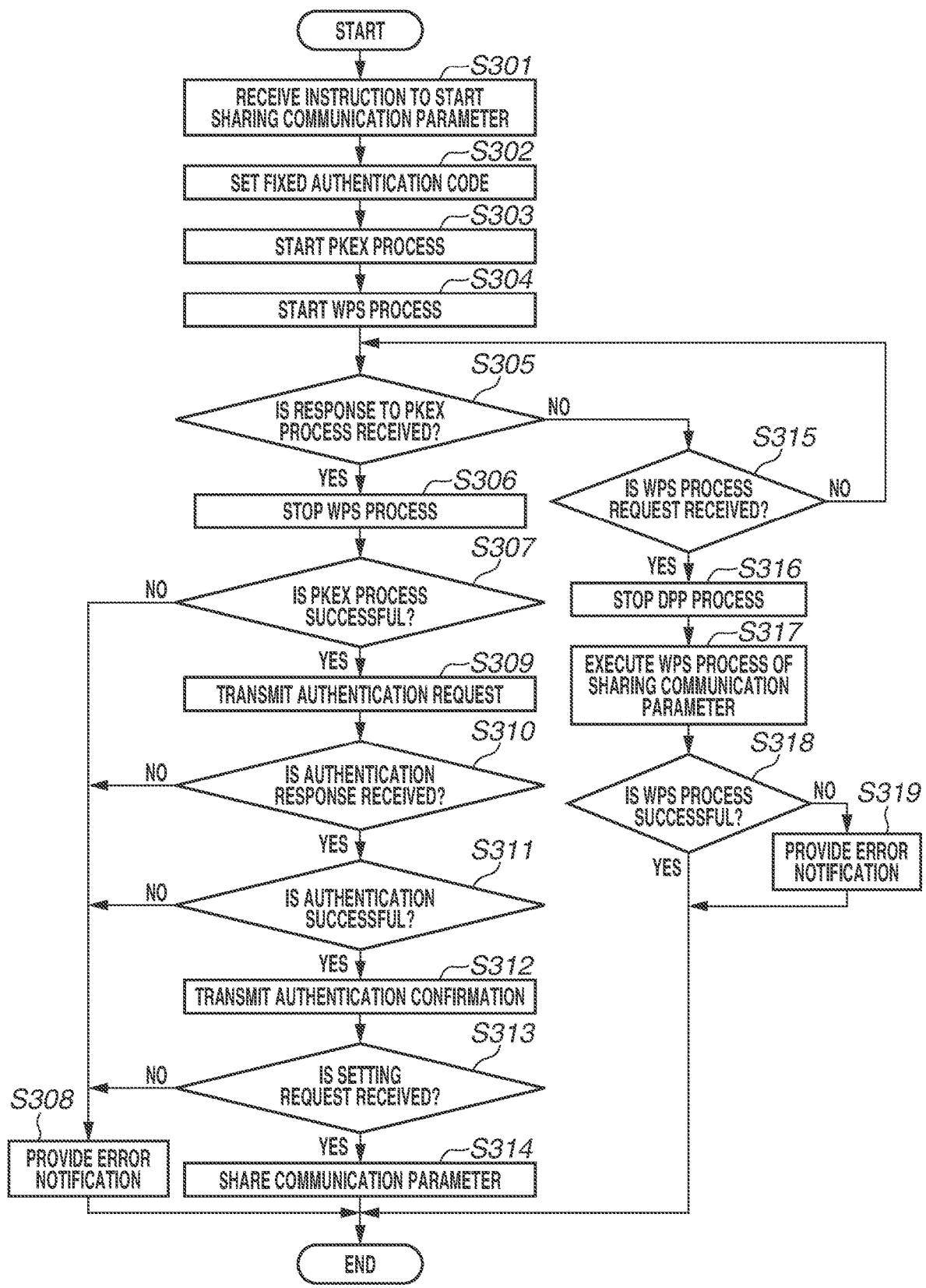
FIG. 3 is a flowchart that is realized by the communication apparatus 101.

FIG. 3 is a flowchart illustrating a process that is realized by the control unit 202 reading a program stored in the storage unit 201 and executing the read program in a case where the communication apparatus 101 is turned on. The process may be realized in a case where the communication apparatus 101 is changed to a predetermined operation mode, such as a communication setting mode, by a user operation or in a case where a predetermined application, such as a communication setting application, is activated, instead of a case where the communication apparatus 101 is turned on.

At least part of the flowchart illustrated in FIG. 3 may be realized by a hardware component. In a case where part of the flowchart is to be realized by the hardware component, for example, a dedicated circuit is automatically generated on a field-programmable gate array (FPGA) from a program for realizing the steps using a predetermined complier. As in the FPGA, a gate array circuit may be formed to realize part of the flowchart as a hardware component. Part of the flowchart may be realized by an application-specific integrated circuit (ASIC). In this case, each block in the below-described flowcharts may be regarded as a hardware block. A plurality of blocks may collectively be configured as a single hardware block, or a single block may be configured as a plurality of hardware blocks.

In step S301, the communication apparatus 101 first waits for a communication parameter sharing start instruction from a user. In the present exemplary embodiment, the communication apparatus 101 receives a communication parameter sharing start instruction from the user via the input unit 204. The input unit 204 may be a hardware button or a button on a user interface (UI) displayed on the output unit 205. The communication apparatus 101 may receive a communication parameter sharing start instruction from an external apparatus (e.g., a remote controller that performs infrared communication), which is not illustrated. If a communication parameter sharing start instruction is received, the communication apparatus 101 starts the DPP process. Specifically, in step S302, the communication apparatus 101 sets a predetermined fixed character string as an authentication code to be used in a Public Key Exchange (PKEX) process compliant with the DPP standard and the Internet Engineering Task Force (IETF) draft. The PKEX process compliant with the IETF is also referred to as "public key exchange protocol".

The fixed character string herein is, for example, a fixed numerical character string, such as "0000", an alphabetical character string (a symbol may be contained), such as "Push-Button-Configuration", or an alphanumeric character string containing a combination of alphabetic and numeric characters. The fixed character string may be determined to be a common character string in the DPP standard or may be determined to be a fixed character string corresponding to each service. For example, in a case where the communication parameter sharing process is executed using the DPP standard to execute a printing service, a first fixed character string "Print" is used as the authentication code. In a case where the communication parameter sharing process is executed using the DPP standard to execute a display service, a second fixed character string "Display" is used as the authentication code.

The printing service is a service in which an apparatus transmits print data and another apparatus receives the print data and prints the print data. The display service is a service in which an apparatus transmits display image data and another apparatus receives the display image data and displays the display image data.

The authentication code may be a fixed character string (e.g., "0005" in a case where the button is pressed five times) corresponding to the number of times the button is pressed by the user. In this case, the user needs to press the buttons on the communication apparatuses 101 and 102 the same number of times.

Which fixed code is to be used as the authentication code is predetermined in the standards or the system.

If the authentication code is set, in step S303, the communication apparatus 101 starts the PKEX process with the communication apparatus 102 using the authentication code. Specifically, the communication apparatus 101 transmits a code exchange request compliant with the DPP standard on a predetermined fixed channel (e.g., 6 ch) and waits for reception. The communication apparatus 101 may only wait for reception without transmitting a code exchange request. Details of the PKEX process will be described below.

In step S304, the communication apparatus 101 further starts the WPS process. In the present exemplary embodiment, a process compliant with a push button configuration (PBC) method compliant with the WPS standard is started. Specifically, in a case where the wireless network 103 is not established, the communication apparatus 101 initially establishes the wireless network 103. At this time, the communication apparatus 101 establishes the wireless network 103 on the fixed channel (e.g., 6 ch) for transmitting a code exchange request and waiting for reception. The communication apparatus 101 starts waiting for a Probe Request frame from an enrollee (e.g., the communication apparatus 102). The communication apparatus 101 waits for a Probe Request frame on an operation channel of the wireless network 103.

If a Probe Request frame is received, the communication apparatus 101 transmits a Probe Response frame with an Information Element indicating that the WPS process is being started.

Next, in step S305, the communication apparatus 101 determines whether a code exchange request or a response to the code exchange request transmitted from the communication apparatus 101 is received from the enrollee (e.g., the communication apparatus 102) compliant with the DPP standard. The code exchange request and the response to the code exchange request are both action frames compliant with the IEEE 802.11 series standards and are signals compliant with the DPP standard. In a case where the communication apparatus 101 determines that a code exchange request or a response is received (YES in step S305), the processing proceeds to step S306. In a case where the communication apparatus 101 determines that a code exchange request or a response is not received (NO in step S305), the processing proceeds to step S315.

The operation in step S305 will specifically be described below. In a case where the code exchange request is transmitted in step S303, the communication apparatus 101 determines whether a response to the code exchange request is received. In a case where a response is received (YES in step S305), the processing proceeds to step S306, whereas in a case where a response is not received (NO in step S305), the processing proceeds to step S315. At this time, the communication apparatus 101 may further determine whether a code exchange request from the enrollee is received. In this case, in a case where a signal of a code exchange request or a signal of a response to the code exchange request is received (YES in step S305), the processing proceeds to step S306, whereas neither one of the signals is received (NO in step S305), the processing proceeds to step S315.

In a case where a code exchange request is not transmitted in step S303, the communication apparatus 101 determines whether a code exchange request is received, and in a case where a code exchange request is received (YES in step S305), the processing proceeds to step S306. In a case where a code exchange request is not received (NO in step S305), the processing proceeds to step S315.

In step S306, the communication apparatus 101 stops the WPS process. The present exemplary embodiment is not limited to this process. The operation in step S306 may be skipped, or the WPS process may be continued for a predetermined period of time from the time of reception of the communication parameter sharing start instruction in step S301. The WPS process may be continued until a stop instruction is received from the user. In a case where a WPS start request is received from the enrollee while the WPS process is continued, the communication apparatus 101 executes the operations in steps S317 to S319 in parallel with the DPP process or after the DPP process is ended.

In step S307, the communication apparatus 101 checks whether the PKEX process is successful.

In the PKEX process, the communication apparatuses 101 and 102 authenticate each other using the authentication code and exchange a public key for authentication (e.g., a bootstrapping key defined in the DPP standard) for use in the subsequent processes. Specifically, if the PKEX process using the authentication code is successful, the communication apparatuses 101 and 102 may share their public keys for authentication. Details of the PKEX process will be described below with reference to FIG. 4.

In a case where the PKEX process fails because the authentication code does not match or a communication error occurs (NO in step S307), in step S308, the communication apparatus 101 provides an error notification. Specifically, the communication apparatus 101 provides an error notification to the user by displaying an error message indicating that the communication parameter sharing process fails or the authentication process fails on the output unit 205. In addition to or in place of the display of the message, the communication apparatus 101 may notify the communication apparatus 102 of the error. The error notification may contain an error code indicating the cause of the error.

Then, the communication apparatus 101 ends the process illustrated in FIG. 3. Instead of ending the process illustrated in FIG. 3, the processing may return to step S301 to wait for a new communication parameter sharing start instruction.

In a case where the PKEX process is successful (YES in step S307), in step S309, the communication apparatus 101 transmits an authentication request to start an authentication process that is different from the authentication process executed in the PKEX process and is compliant with the DPP standard to the communication apparatus 102. The authentication request herein refers to a DPP Authentication Request frame compliant with the DPP standard. The authentication request contains authentication information for use in the authentication process, identification information about the communication apparatus 101, a random number generated by the communication apparatus 101, and a public key (public key of the communication apparatus 101) for shared key generation. The shared key is used in encrypting the random number for authentication.

The authentication information herein refers to, specifically, a hash value of a public key of the communication apparatus 102 for authentication that is acquired through the PKEX process. The identification information about the communication apparatus 101 refers to, specifically, a hash value of a public key of the communication apparatus 101 for authentication that is transmitted to the communication apparatus 102 in the PKEX process. The random number is used for authentication when an authentication response is received, which will be described below.

In step S310, after transmitting the authentication request, the communication apparatus 101 waits for an authentication response from the communication apparatus 102 for a predetermined period of time. The period of time to wait for an authentication response may be a predetermined period of time from the transmission of the authentication request or may be a predetermined period of time from the time of reception of the communication parameter sharing start instruction in step S301.

After receiving the authentication request, the communication apparatus 102 verifies the apparatus that is the transmitter of the authentication request. This determination is performed using the authentication information contained in the authentication request. Specifically, the communication apparatus 102 calculates the hash value of the public key of the communication apparatus 102 for authentication and compares the calculated hash value with the hash value (authentication information) contained in the authentication request, and in a case where the hash values match, the communication apparatus 102 determines that the verification is successful. A hash function for use in the hash value calculation is defined in the DPP standard and is the same as the hash function used in the hash value calculation by the communication apparatus 101.

In a case where the verification is successful, the communication apparatus 102 generates a shared key using both the public key of the communication apparatus 101 for shared key generation and a secret key of the communication apparatus 102 for shared key generation. The shared key is generated based on, for example, an Elliptic Curve Diffie-Hellman (ECDH) method. A shared key generation method is not limited to the ECDH method, and any other public key encryption methods may be used.

The communication apparatus 102 transmits an authentication response. In a case where the verification is unsuccessful, the communication apparatus 102 does not transmit an authentication response. Instead, in a case where the verification is unsuccessful, the communication apparatus 102 may transmit an authentication response indicating that the verification is unsuccessful.

The authentication response herein refers to a DPP Authentication Response frame compliant with the DPP standard. The authentication response contains a public key of the communication apparatus 102 for shared key generation, a random number generated by the communication apparatus 102, and tag information. The tag information is one obtained by encrypting the random number contained in the authentication request transmitted from the communication apparatus 101 with the shared key. The tag information is used in the authentication process by the communication apparatus 101.

Return to the description of step S310. In a case where the communication apparatus 101 does not receive an authentication response within the predetermined period of time (NO in step S310), the processing proceeds to step S308. In step S308, the communication apparatus 101 provides an error notification. The processing proceeds to step S308 also in a case where an authentication response indicating that the verification is unsuccessful is received.

An error notification method is similar to that in step S307, so that descriptions thereof are omitted. In a case where an error code is to be contained, a notification indicating that the cause of the error is different from that in step S307 may be provided. Thereafter, the communication apparatus 101 ends the process illustrated in FIG. 3. Instead of ending the process illustrated in FIG. 3, the processing may return to step S301 to wait for a new communication parameter sharing start instruction.

In a case where the communication apparatus 101 receives an authentication response within the predetermined period of time (YES in step S310), the processing proceeds to step S311. In step S311, the communication apparatus 101 authenticates the communication apparatus 102 based on the information contained in the authentication response. This will be described in more detail below. The communication apparatus 101 initially generates a shared key using a secret key of the communication apparatus 101 for shared key generation and the public key of the communication apparatus 102 for shared key generation by the same method as the method of shared key generation by the communication apparatus 102.

The secret key of the communication apparatus 101 for shared key generation is the secret key of the communication apparatus 101 that corresponds to the public key of the communication apparatus 101 for shared key generation that is used in generating the shared key by the communication apparatus 102. The public key of the communication apparatus 102 for shared key generation is the public key that corresponds to the secret key of the communication apparatus 102 for shared key generation that is used in generating the shared key by the communication apparatus 102. Using the combination of such keys, the communication apparatus 101 may generate the same shared key as the shared key generated by the communication apparatus 102.

In a case where the public keys of the communication apparatuses 101 and 102 for shared key generation are not correctly transmitted and received between the communication apparatuses 101 and 102 through the transmission and reception of the authentication request and the authentication response, the same shared key cannot be generated.

Next, the communication apparatus 101 decrypts the tag information contained in the authentication response with the generated shared key and checks whether the random number contained in the authentication request is correctly decrypted. In a case where the random number is correctly decrypted, the communication apparatus 101 determines that the communication apparatus 102 is successfully authenticated. In a case where the random number is not correctly decrypted, the communication apparatus 101 determines that the communication apparatus 102 is unsuccessfully authenticated. A case where the random number is not correctly decrypted is, for example, a case where the same shared key is not generated.

In a case where the authentication is unsuccessful (NO in step S311), the processing proceeds to step S308, and the communication apparatus 101 provides an error notification. In a case where the authentication is successful (YES in step S311), the processing proceeds to step S312. In step S312, the communication apparatus 101 transmits an authentication confirmation to the communication apparatus 102. The authentication confirmation herein refers to a DPP Authentication Confirm frame compliant with the DPP standard and contains tag information. The tag information is one obtained by encrypting the random number contained in the authentication response transmitted from the communication apparatus 102 with the shared key by the communication apparatus 101.

In step S313, after transmitting the authentication confirmation, the communication apparatus 101 waits for a setting request from the communication apparatus 102 for a predetermined period of time. The period of time to wait for a setting request may be a predetermined period of time from the time of transmission of the authentication request or may be a predetermined period of time from the time of reception of the communication parameter sharing start instruction in step S301. The predetermined period of time in step S313 may be the same as or different from the predetermined period of time in step S310.

The communication apparatus 102 that has received the authentication confirmation determines that the authentication is successful in a case where the tag information contained in the authentication confirmation is correctly decrypted with the shared key generated by the communication apparatus 102. In a case where the communication apparatus 102 determines that the authentication is successful, the communication apparatus 102 identifies the communication apparatus 101 that is the transmitter of the authentication request as a configurator and transmits a setting request to the communication apparatus 101. The setting request herein refers to a DPP Configuration Request frame compliant with the DPP standard. The setting request contains device information and role information about the communication apparatus 102. The device information includes a device name of the communication apparatus 102. The role information is information indicating a role after the communication parameter is received, which is "access point" or "station". The information contained in the setting request is encrypted with the shared key used to encrypt the tag information at the time of transmission of the authentication response by the communication apparatus 102. In a case where the communication apparatus 102 determines that the authentication is unsuccessful, i.e., in a case where the authentication fails, the communication apparatus 102 does not transmit a setting request.

Return to the description of step S313. In a case where a setting request from the communication apparatus 102 is not received within the predetermined period of time (NO in step S313), the processing proceeds to step S308, and the communication apparatus 101 provides an error notification. In a case where a setting request from the communication apparatus 102 is received within the predetermined period of time (YES in step S313), in step S314, the communication apparatus 101 executes a process of providing the communication parameter for connecting to the wireless network 103 as a setting response. The setting response is a DPP Configuration Response frame compliant with the DPP standard.

The setting response transmitted from the communication apparatus 101 contains the communication parameter, the expiration date of the communication parameter, a dedicated public key of the communication apparatus 101 for the configurator, and the role information. The communication parameter contains credentials compliant with the DPP standard and the public key contained in the authentication response from the communication apparatus 102. In the setting response, the communication parameter is encrypted with a dedicated secret key of the communication apparatus 101 for the configurator. Further, the information contained in the setting response is encrypted with the shared key generated by the communication apparatus 101.

After transmitting the setting request, the communication apparatus 102 serving as the enrollee waits for a setting response from the communication apparatus 101 serving as the configurator. After receiving the setting response, the communication apparatus 102 decrypts the setting response with an information shared key contained in the setting response. Further, the communication apparatus 102 decrypts the communication parameter encrypted with the dedicated secret key of the communication apparatus 101 for the configurator with the dedicated public key of the communication apparatus 101 for the configurator. The communication apparatus 102 may connect to the wireless network 103 using the decrypted communication parameter.

Return to the description of step S305. In a case where a signal compliant with the DPP standard is not received in step S305 (NO in step S305), the processing proceeds to step S315. In step S315, the communication apparatus 101 determines whether a WPS start request is received from the enrollee. The WPS start request is, for example, an Extensible Authentication Protocol over LAN (EAPOL)-Start signal compliant with the IEEE 802.11 series standards. The WPS start request may be an Association Request (connection request signal) with a WPS Information Element instead of the EAPOL-Start signal.

On the other hand, in a case where a WPS start request is not received (NO in step S315), the processing proceeds to step S305, and the communication apparatus 101 redetermines whether a signal compliant with the DPP standard is received. In a case where a predetermined period of time passes from the time of reception of the communication parameter sharing start instruction in step S301, the process illustrated in FIG. 3 may be ended without proceeding to step S305. The predetermined period of time herein is two minutes as defined in the WPS standard. In a case where the process illustrated in FIG. 3 is to be ended, the communication apparatus 101 may provide an error notification to the user via the output unit 205.

In a case where a WPS start request is received from the enrollee (YES in step S315), the processing proceeds to step S316. In step S316, the communication apparatus 101 stops the DPP process. The present exemplary embodiment is not limited to this, and the operation in step S316 may be skipped, or the DPP process may be continued for a predetermined period of time from the time of reception of the communication parameter sharing start instruction in step S301. The DPP process may be continued until a stop instruction is received from the user. In a case where a signal compliant with the DPP standard is received from the enrollee while the DPP process is continued, the communication apparatus 101 executes steps S307 to S314 in parallel with the WPS process or after the WPS process is ended.

Then, in step S317, the communication apparatus 101 executes the communication parameter sharing process compliant with the WPS standard, and in step S318, the communication apparatus 101 determines whether the communication parameter sharing process is successful. In a case where the WPS process is unsuccessful due to, for example, a communication error (NO in step S318), the processing proceeds to step S319. In step S319, the communication apparatus 101 provides an error notification. Specifically, the communication apparatus 101 notifies the user of the error by displaying a message indicating that the communication parameter sharing process is unsuccessful or a message indicating that the authentication process is unsuccessful on the output unit 205. In addition to or in place of the display of the message, the communication apparatus 101 may notify the communication apparatus 102 of the error. The error notification may contain an error code indicating the cause of the error. Thereafter, the communication apparatus 101 ends the process illustrated in FIG. 3. Instead of ending the process illustrated in FIG. 3, the processing may return to step S301 to wait for a new communication parameter sharing start instruction.

Figure 4:
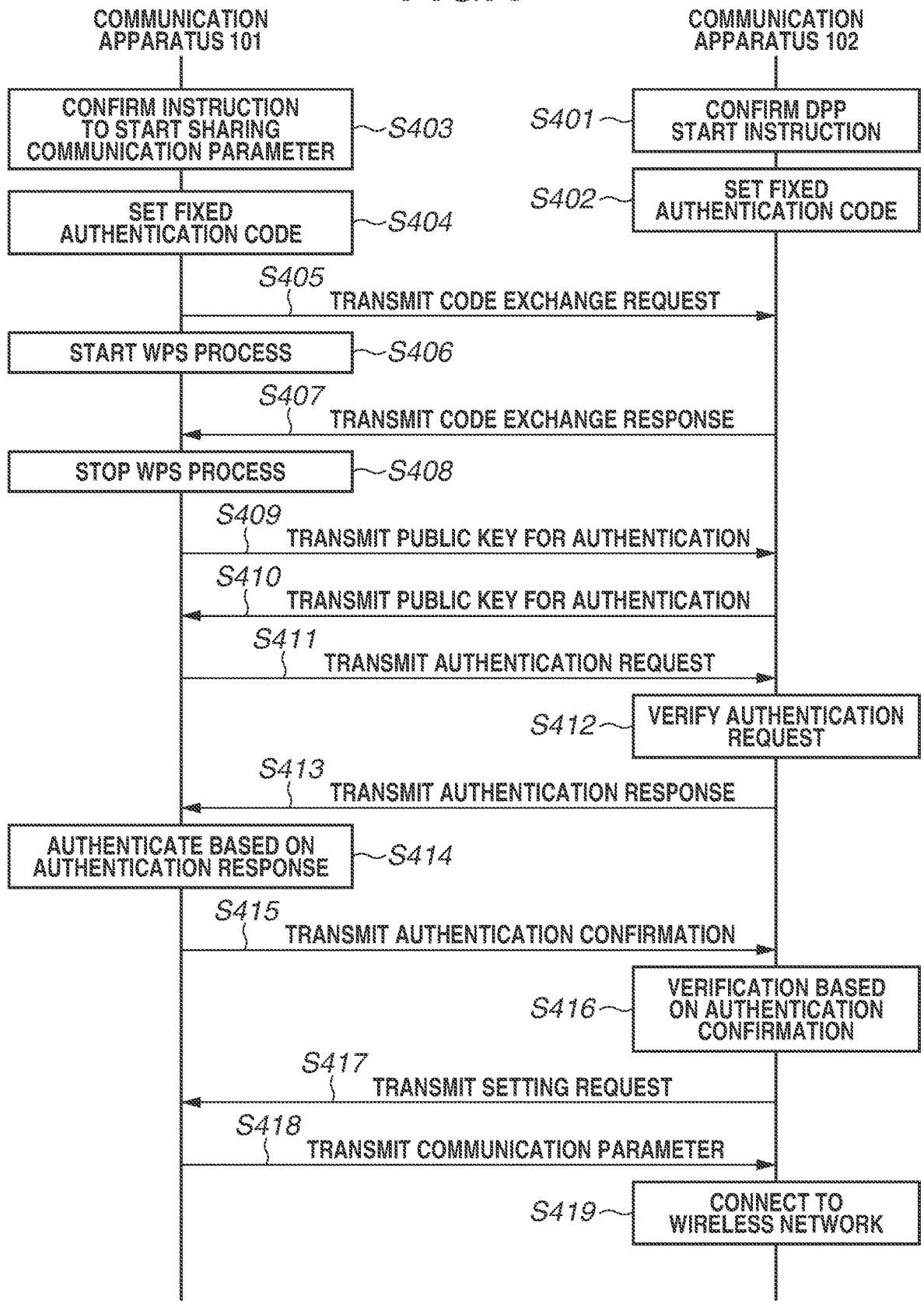
FIG. 4 is a diagram illustrating a sequence between the communication apparatuses 101 and 102.

Operations of the communication apparatuses 101 and 102 until the communication apparatus 101 that executes the above-described process provides the communication parameter to the communication apparatus 102 will be described in more detail below. FIG. 4 is a sequence diagram illustrating a sequence in which the communication apparatus 101 receives a signal compliant with the DPP standard and provides the communication parameter to the communication apparatus 102 in accordance with the DPP standard.

Initially, in step S401, the communication apparatus 102 receives a DPP start instruction from the user by a push button, and in S402, the communication apparatus 102 sets a fixed authentication code. The authentication code corresponds to a password of the public key exchange protocol in the IETF draft.

Meanwhile, in step S403, the communication apparatus 101 receives a communication parameter sharing start instruction from the user by a push button, and in step S404, the communication apparatus 101 sets a fixed authentication code. Specifically, the communication apparatus 101 generates an encryption element Qa by combining a hash (Hash) of the set authentication code with an element (Pi) defined in the DPP standard. The communication apparatus 101 generates a temporary key pair (secret key x and public key X) and generates an information element M by adding the public key X of the generated temporary key pair to the encryption element Qa. The public key X and the information element M are vectors each containing x- and y-components.

$Qa = \text{Hash}(\text{authentication code}) * Pi$ $M = X + Qa$

In step S405, the communication apparatus 101 transmits a code exchange request containing the generated encryption element Qa, the information element M, and an identifier (e.g., Media Access Control (MAC) address) of the communication apparatus 101 to the communication apparatus 102. In the present exemplary embodiment, the code exchange request is transmitted using an action frame compliant with the IEEE 802.11 series. The present exemplary embodiment is not limited thereto, and a signal compliant with NFC, Bluetooth®, TransferJet, Ethernet, or USB may be used.

Consequently, an authentication phase of the public key exchange protocol in the IETF draft is started. In step S406, after transmitting the code exchange request compliant with the DPP standard, the communication apparatus 101 starts the WPS process in parallel.

After receiving the code exchange request from the communication apparatus 101, the communication apparatus 102 calculates a temporary key X' using the information element M contained in the code exchange request and an encryption element Qa' calculated by the communication apparatus 102. The communication apparatus 102 generates the encryption element Qa' by combining the hash of the authentication code set by the communication apparatus 102 and the element (Pi) defined in the DPP standard.

$Qa' = \text{Hash}(\text{authentication code}) * Pi$ $X' = M - Qa'$

In a case where the fixed authentication code set by the communication apparatus 101 is the same as the fixed authentication code set by the communication apparatus 102, the values of Qa and Qa' are equal. As a result, the values of X and X' become also equal. Accordingly, the communication apparatus 102 obtains the public key X of the temporary key pair of the communication apparatus 101.

The communication apparatus 102 further generates an encryption element Qb by combining the hash of the set authentication code with an element (Pr) defined in the DPP standard. The communication apparatus 101 generates a temporary key pair (secret key y and public key Y) and generates an information element N by adding the public key Y of the generated temporary key pair to the encryption element Qb. The public key Y and the information element N are vectors each containing x- and y-components.

$Qb = \text{Hash}(\text{authentication code}) * Pr$ $N = Y + Qb$

In step S407, the communication apparatus 102 transmits a code exchange response containing the generated encryption element Qb, the information element N, and an identifier (e.g., MAC address) of the communication apparatus 102 to the communication apparatus 101. In step S408, in a case where the code exchange response from the communication apparatus 102 is received, the communication apparatus 101 stops the WPS process. After receiving the code exchange response from the communication apparatus 102, the communication apparatus 101 calculates a temporary key Y' based on the information element N contained in the code exchange response and an encryption element Qb' calculated by the communication apparatus 101. The communication apparatus 101 generates the encryption element Qb' by combining the hash of the authentication code set by the communication apparatus 101 with the element (Pr) defined in the DPP standard.

$Qb' = \text{Hash}(\text{authentication code}) * Pr$ $Y' = N - Qb'$

In a case where the fixed authentication code set by the communication apparatus 101 is the same as the fixed authentication code set by the communication apparatus 102, the values of Qb and Qb' become equal. Thus, the values of X and X' become also equal. As a result, the communication apparatus 101 obtains the public key Y of the temporary key pair of the communication apparatus 102.

In a case where the communication apparatus 101 does not receive a code exchange response from the communication apparatus 102 within a predetermined period of time from the time of reception of the DPP start instruction, the communication apparatus 101 may determine that the PKEX process is unsuccessful, and the processing may proceed. Specifically, the communication apparatus 101 may end the sharing process after executing the error process in step S305 in FIG. 3 without sharing the communication parameter. The sharing process is ended if a DPP start instruction is not issued within the predetermined period of time between the communication apparatuses 101 and 102, so that security improves.

Next, the communication apparatus 101 calculates temporary encryption information K from the secret key x of the communication apparatus 101 and the public key Y' of the communication apparatus 102. The encryption information K is a vector value containing x- and y-components. The communication apparatus 101 further calculates a common key Z using a function KDF-n (Key Delivery Function) defined in the IETF draft.

$$K = x * Y'$$

Z=KDF-n(< >, the identifier of the communication apparatus 101|the identifier of the communication apparatus 102|M.x|N.x|authentication code, K.x)

In the above formula, "< >" indicates that a first argument passed to the function is blank, and "|" indicates that the elements are to be combined. Further, M.x, N.x, and K.x respectively indicate the values of x-components of M, N, and K.

Meanwhile, the communication apparatus 102 calculates temporary encryption information K' from the secret key y of the communication apparatus 102 and the public key X' of the communication apparatus 101. A common key Z' is calculated using the same function KDF-n.

$$K' = y * X'$$

Z=KDF-n(< >, the identifier of the communication apparatus 101|the identifier of the communication apparatus 102 |M.x|N.x|authentication code, K'.x)

In a case where the values of X and X' are equal and the values of Y and Y' are equal, the values of K and K' are equal. Thus, the values of Z' and Z are also equal. As a result, the communication apparatuses 101 and 102 share the same common key Z, and the authentication phase of the public key exchange protocol is completed.

After the authentication phase of the public key exchange protocol is completed, a public key sharing phase (Reveal Phase) of the public key exchange protocol in the IETF draft is started.

Specifically, the communication apparatus 101 calculates an information element u using the identifier of the communication apparatus 101, the public key of the communication apparatus 101 for authentication (e.g., a bootstrapping key defined in the DPP standard), X.x, and Y'.x. Herein, X.x, and Y'.x respectively indicate the values of x-components of X and Y'. In step S409, the communication apparatus 101 encrypts the information element u and the public key of the communication apparatus 101 for authentication with the common key Z and transmits the encrypted information element u and the encrypted public key.

The communication apparatus 102 calculates an information element u' using the identifier of the communication apparatus 101, the public key of the communication apparatus 101 for authentication, X'.x, and Y.x. In step S410, the communication apparatus 102 encrypts the information element u' and the public key of the communication apparatus 102 for authentication with the common key Z and transmits the encrypted information element u' and the encrypted public key.

The communication apparatus 101 decrypts the information element u' and the public key of the communication apparatus 102 for authentication that are received from the communication apparatus 102 using the common key Z. In a case where the acquired information element u' matches the information element u calculated by the communication apparatus 101, the communication apparatus 101 determines that the PKEX process is successful. In a case where the authentication codes that are mutually set by the communication apparatuses 101 and 102 match as described above, the information elements u and u' match. The authentication process using the authentication code in the PKEX process is executed as described above, and the public keys of the communication apparatuses 101 and 102 for authentication are shared. After the public keys of the communication apparatuses 101 and 102 for authentication are shared, the public key sharing phase (Reveal Phase) of the public key exchange protocol is completed.

Next, in step S411, the communication apparatus 101 generates an authentication request and transmits the authentication request. In step S412, the communication apparatus 102 receives the authentication request and verifies the content of the received authentication request. In step S413, the communication apparatus 102 generates an authentication response and transmits the authentication response. After transmitting the authentication response to the communication apparatus 101, the communication apparatus 102 waits for an authentication confirmation from the communication apparatus 101.

In step S414, after receiving the authentication response, the communication apparatus 101 executes authentication compliant with the authentication response. In a case where the communication apparatus 101 determines that the authentication is successful, in step S415, the communication apparatus 101 transmits an authentication confirmation to the communication apparatus 102. In step S416, after receiving the authentication confirmation from the communication apparatus 101, the communication apparatus 102 verifies the content of the authentication confirmation. In a case where the communication apparatus 102 determines that the authentication is successful, in step S417, the communication apparatus 102 transmits a setting request to execute the communication parameter setting process and waits for a setting response from the communication apparatus 101. In step S418, after receiving the setting request, the communication apparatus 101 transmits a setting response containing the communication parameter encrypted with the dedicated secret key of the communication apparatus 101 for the configurator and containing the dedicated public key for the configurator. After receiving the setting response, the communication apparatus 102 decrypts the communication parameter with the public key of the communication apparatus 101 for the configurator. Thereafter, in step S419, the communication apparatus 102 connects to the wireless network 103 using the decrypted communication parameter.

Through the processes described above in conjunction with FIGS. 3 and 4, the communication apparatus 101 provides the communication parameter to the communication apparatus 102. While the communication apparatus 101 serving as the configurator transmits the code exchange request in the above-described exemplary embodiment, the communication apparatus 102 serving as the enrollee may transmit the code exchange request. In this case, the communication apparatus 101 serving as the configurator waits for the code exchange request and transmits the code exchange response. Alternatively, the communication apparatuses 101 and 102 may execute transmission and reception by alternately repeating the code exchange request transmission process and the waiting process at suitable time intervals.

Next, a sequence in a case where the communication apparatus 101 receives a Probe Response frame and provides the communication parameter to the communication apparatus 102 in accordance with the WPS standard will be described below with reference to FIG. 6.

First, in step S601, in a case where the communication apparatus 102 receives a WPS start instruction (e.g., the press of the button) from the user, the communication apparatus 102 starts an enrollee process compliant with the WPS standard. Meanwhile, in step S602, in a case where the communication apparatus 101 receives a communication parameter sharing start instruction (e.g., the press of the button) from the user, in step S603, the communication apparatus 101 sets a fixed authentication code. In step S604, the communication apparatus 101 transmits a code exchange request to the communication apparatus 102.

In step S605, after transmitting the code exchange request based on the DPP standard, the communication apparatus 101 starts the WPS process in parallel. Specifically, the communication apparatus 101 starts waiting for a Probe Request frame from the enrollee. In step S606, since the WPS process is activated, the communication apparatus 102 does not execute the DPP process even in a case where the code exchange request from the communication apparatus 101 is received, and the communication apparatus 102 transmits a Probe Request frame to check whether an apparatus that has activated the WPS process is nearby.

In step S607, after receiving the Probe Request frame from the communication apparatus 102, the communication apparatus 101 transmits a Probe Response frame with an Information Element indicating that the WPS process is being activated to the communication apparatus 102. After receiving the Probe Response frame from the communication apparatus 101, the communication apparatus 102 connects to the wireless network 103 established by the communication apparatus 101. Specifically, the communication apparatus 102 transmits an Association Request with a WPS Information Element to the communication apparatus 101.

In step S608, after receiving the Association Request from the communication apparatus 102, the communication apparatus 101 transmits an Association Response with a WPS Information Element to the communication apparatus 102. Thus, in step S609, the communication apparatus 102 establishes connection to the wireless network 103. In a case where the connection is established using a signal with the WPS Information Element, the communication apparatuses 101 and 102 may communicate only signals that are used for sharing the communication parameter to each other. Specifically, the communication apparatuses 101 and 102 cannot communicate user data and the like to each other.

In step S610, after the communication apparatus 102 establishes connection to the wireless network 103, the communication apparatus 101 stops the DPP process. In step S611, the communication apparatus 102 starts the parameter sharing process compliant with the WPS standard. Specifically, the communication apparatus 102 transmits an EAPOL-Start frame and starts a WPS parameter sharing session.

The communication apparatus 101 executes a WPS parameter sharing process with the communication apparatus 102 using an EAP frame. Specifically, in step S612, the communication apparatus 101 shares the encryption key using Diffie-Hellman key exchange (DH) with the EAP frame. The communication apparatus 101 transmits the communication parameter encrypted with the encryption key shared with the communication apparatus 102. In step S613, the communication apparatus 102 decrypts the communication parameter with the encryption key shared with the communication apparatus 101. Thereafter, in step S614, the communication apparatus 102 connects to the wireless network 103 using the decrypted communication parameter. In this case, the communication apparatuses 101 and 102 may communicate user data and the like. Through such a process, the communication apparatus 101 provides the communication parameter to the communication apparatus 102 by the method compliant with the WPS standard.

As described above, in a case where an apparatus that is compliant with a plurality of communication parameter sharing standards including the DPP standard executes the communication parameter sharing process, it is possible to use a simple user interface, which increases user convenience. More specifically, for example, by a user simply pressing a button of the apparatus, the communication parameter sharing standard to be executed is automatically selected from the plurality of communication parameter sharing standards. This increases convenience.

In the above-described exemplary embodiments, the communication apparatus 101 operates as the configurator and provides the communication parameter. The present exemplary embodiment is not limited to those described above, and the communication apparatus 101 may operate as an enrollee and the communication apparatus 102 may operate as a configurator so that the communication apparatus 101 receives the communication parameter from the communication apparatus 102.

The communication apparatus 101 may operate as illustrated in FIG. 5 instead of FIG. 3. Specifically, in step S501, the communication apparatus 101 waits for a communication parameter sharing start instruction from a user. In the present exemplary embodiment, the user can provide a communication parameter sharing start instruction by a plurality of methods. For example, the communication apparatus 101 may include a plurality of buttons each corresponding to different instructions or may include a selection switch. The buttons and the switch may be realized by hardware components or by software.

In step S502, after receiving the communication parameter sharing start instruction from the user, the communication apparatus 101 determines whether the DPP start instruction is a predetermined DPP start instruction. In a case where the DPP start instruction is the predetermined DPP start instruction (YES in step S502), the communication apparatus 101 executes step S302 and the subsequent steps in the above-described process. In a case where the DPP start instruction is not the predetermined DPP start instruction (NO in step S502), in step S503, the user is prompted to input an authentication code. In step S504, the communication apparatus 101 starts the PKEX process using not the fixed authentication code but the user-input authentication code. The processing then proceeds to step S304 described above, and the communication apparatus 101 executes the subsequent processes.

With the above-described configuration, whether or not to execute the DPP communication parameter sharing process using the fixed authentication code or the DPP communication parameter sharing process using the user-input authentication code is selected.

The WPS process may be executed using the authentication code input in step S503 as a personal identification number (PIN) in a PIN mode compliant with the WPS standard. With this configuration, the communication apparatus 101 may select suitable one of the DPP process and the communication parameter sharing process by the PIN method compliant with the WPS standard. The authentication code for use in the PKEX process and the PIN input for use in the PIN method can be shared, thus increasing user convenience. In a case where the input authentication code is not the PIN method compliant with the WPS standard, i.e., in a case where the input authentication code is not a 4- or 8-digit number, the communication apparatus 101 may be configured not to execute the PIN method. In this case, the communication apparatus 101 may execute only the DPP process or may execute both the DPP process and the PBC mode compliant with the WPS standard. In such a case, the communication apparatus 101 notifies the user that the input authentication code cannot be used in the PIN method.

In step S503, the communication apparatus 101 may generate a random authentication code and display the random authentication code instead of inputting the authentication code. In this case, the communication apparatus 101 may generate an authentication code that is useable also in the PIN method compliant with the WPS standard. The communication apparatus 101 executes the subsequent processes using the authentication code. The user is to input the authentication code to the communication apparatus 102 that serves as the communication parameter sharing partner.

In step S502, an instruction to execute only the DPP process may be received. In a case where the instruction is received, the communication apparatus 101 executes steps S302, S303, and S305. In a case where a signal compliant with the DPP standard is not received (NO in step S305), the operation in step S305 is repeated. In this case, the process illustrated in FIG. 3 may be ended in a case where a predetermined period of time passes from the time of reception of the communication parameter sharing start instruction in step S501. In this case, the communication apparatus 101 may notify the user of the error via the output unit 205. In a case where a signal compliant with the DPP standard is received (YES in step S305), the processing proceeds to step S307, and the operations in step S307 and the subsequent steps are executed.

In the above-described exemplary embodiment, the communication apparatus 101 operates as the registrar and provides the communication parameter. The present exemplary embodiment is not limited to that described above, and the communication apparatus 101 may operate as an enrollee and the communication apparatus 102 may operate as a configurator or a registrar so that the communication apparatus 10s1 receives the communication parameter from the communication apparatus 102.

In a case where the communication apparatus 101 operates as the enrollee, in step S304, the communication apparatus 101 starts transmitting a Probe Request frame. At this time, the communication apparatus 101 transmits the Probe Request frame over a plurality of channels and waits for reception of a Probe Response frame. The signal reception waiting time may be set long only for the fixed channel (e.g., 6 ch) compliant with the DPP standard. This increases the possibility of early reception of a signal compliant with the DPP standard besides the Probe Response frame by the communication apparatus 101. In a case where a signal compliant with the DPP standard is received (YES in step S305), the processing proceeds to step S306.

In a case where a Probe Response frame is received from the communication apparatus 102, the communication apparatus 101 transmits an Association Request with a WPS Information Element to the communication apparatus 102. Then, in step S315, the communication apparatus 101 determines whether an Association Response with a WPS Information Element is received from the communication apparatus 102. In a case where an Association Response is not received (NO in step S315), the processing returns to step S305. In a case where an Association Response is received (YES in step S315), the processing proceeds to step S316, and the communication apparatus 101 transmits an EAPOL-Start frame and starts the WPS parameter sharing session with the communication apparatus 102. In a case where the communication apparatus 101 receives the communication parameter from the communication apparatus 102 (YES in step S318), the process illustrated in FIG. 3 is ended. On the other hand, in a case where the communication parameter is not received from the communication apparatus 102 (NO in step S318), in step S319, the communication apparatus 101 provides an error notification to the user and the communication apparatus 102.

With the foregoing process, the present exemplary embodiment becomes applicable to a case where the communication apparatus 101 operates as the enrollee.

In the above-described exemplary embodiment, the communication apparatus 101 starts the WPS process together with the DPP process. In place of or in addition to the processes, the communication apparatus 101 may start a process compliant with other communication parameter sharing standards, such as Wi-Fi Direct or AirStation One-Touch Secure System (AOSS). At this time, the user may preset which one of the communication parameter sharing standards is to be started in a case where the communication apparatus 101 receives a communication parameter sharing start instruction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention increases user convenience of an apparatus capable of executing a communication parameter sharing process compliant with the DPP standard and another sharing process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
a reception unit configured to receive, from a user, a sharing start instruction for starting a process for sharing with another communication apparatus, a communication parameter for connecting to a wireless network;
a first processing unit configured to execute a first process for sharing a communication parameter for connecting to the wireless network in accordance with a first method compliant with a Wi-Fi Device Provisioning Protocol (DPP) standard;
a second processing unit configured to execute a second process for sharing a communication parameter for connecting to the wireless network in accordance with a second method compliant with another standard different from the DPP standard; and
a control unit configured to control execution of the first and second sharing processes in such a manner that, in response to reception of the sharing start instruction by the reception unit, the control unit waits for the communication apparatus to receive, from the other communication apparatus, a DPP signal compliant with the DPP standard and also waits for the communication apparatus to receive, from the other communication apparatus, another signal compliant with the other standard,
wherein
the communication apparatus executes the first process of sharing a communication parameter by the first processing unit in a case where (i) among the DPP signal compliant with the DPP standard and the signal compliant with the other standard, the signal received from the other communication apparatus is the DPP signal compliant with the DPP standard, and (ii) an authentication by a public key is successful, and
the communication apparatus executes the second process of sharing a communication parameter by the second processing unit in a case where among the DPP signal compliant with the DPP standard and the signal compliant with the other standard, the signal received from the other communication apparatus is the signal compliant with the other standard.

2. The communication apparatus according to claim 1, wherein the DPP signal is a signal that is used between the communication apparatus and the other communication apparatus to share a predetermined public key defined in the DPP standard with the other communication apparatus using an authentication code.

3. The communication apparatus according to claim 2, wherein the predetermined public key is a bootstrapping key compliant with the DPP standard.

4. The communication apparatus according to claim 1, further comprising an input unit configured to prompt the user to input a code,
wherein the first processing unit and the second processing unit execute the process of sharing using a common code input via the input unit.

5. The communication apparatus according to claim 1,
wherein the other standard is a Wi-Fi Protected Setup (WPS) standard, and
wherein the other standard is a method in accordance with a personal identification number (PIN) method compliant with the WPS standard.

6. The communication apparatus according to claim 1, wherein the other standard is a Wi-Fi Protected Setup (WPS) standard.

7. The communication apparatus according to claim 6, wherein the second method is a method in accordance with a push button configuration (PBC) method compliant with the WPS standard.

8. The communication apparatus according to claim 6, wherein the other standard is a method in accordance with a personal identification number (PIN) method compliant with the WPS standard.

9. The communication apparatus according to claim 1, wherein the other standard is a Wi-Fi Direct standard.

10. The communication apparatus according to claim 1, wherein the other standard is an AirStation One-Touch Secure System (AOSS) standard.

11. The communication apparatus according to claim 1, further comprising a setting unit configured to set which standard is to be used as the other standard.

12. The communication apparatus according to claim 1, wherein the reception unit is a button.

13. The communication apparatus according to claim 1, wherein the waiting for the DPP signal compliant with the DPP standard is performed before performing the waiting for the signal compliant with the other standard.

14. The communication apparatus according to claim 1, wherein the sharing start instruction is issued by a user pressing a predetermined key of the communication apparatus.

15. The communication apparatus according to claim 1, wherein the sharing start instruction is issued by a user touching a predetermined key of a display of the communication apparatus.

16. The communication apparatus according to claim 1, wherein the control unit performs a predetermined process to determine which of the first process and the second process to execute and, even if both the DPP signal compliant with the DPP standard and the signal compliant with the other standard are received, only one of the first process and the second process is executed.

17. The communication apparatus according to claim 1, wherein the communication apparatus executes a preliminary step compliant with the DPP standard and executes a preliminary step compliant with the other standard prior to performing the waiting, and the communication apparatus does not perform the first process or the second process until after the respective DPP signal compliant with the DPP standard or the respective signal compliant with the other standard is received during the waiting.

18. A method for controlling a communication apparatus, the method comprising:

receiving, from a user, a sharing start instruction for starting a process for sharing with another communication apparatus, a communication parameter for connecting to a wireless network;

executing a first process for sharing a communication parameter for connecting to the wireless network in accordance with a first method compliant with a Wi-Fi Device Provisioning Protocol (DPP) standard;

executing a second process for sharing a communication parameter for connecting to the wireless network in accordance with a second method compliant with another standard different from the DPP standard; and controlling execution of the first and second sharing processes in such a manner that, in response to reception of the first sharing start instruction by the reception unit, the control unit waits for the communication apparatus to receive, from the other communication apparatus, a DPP signal compliant with the DPP standard and also waits for the communication apparatus to receive, from the other communication apparatus, another signal compliant with the other standard, and wherein the communication apparatus executes the first process of sharing a communication parameter in a case where among the DPP signal compliant with the DPP standard and the signal compliant with the other standard, the signal received from the other communication apparatus is the DPP signal compliant with the DPP standard, and an authentication by a public key is successful, and the communication apparatus executes the second process of sharing a communication parameter in a case where among the DPP signal compliant with the DPP standard and the signal compliant with the other standard, the signal received from the other communication apparatus is the signal compliant with the other standard.

19. A storage medium storing a program for causing a computer to function as a communication apparatus that performs a process comprising:

receiving, from a user, a sharing start instruction for starting a process for sharing with another communication apparatus, a communication parameter for connecting to a wireless network;

executing a first process for sharing a communication parameter for connecting to the wireless network in accordance with a first method compliant with a Wi-Fi Device Provisioning Protocol (DPP) standard;

executing a second process for sharing a communication parameter for connecting to the wireless network in accordance with a second method compliant with standard different from the DPP standard; and controlling execution of the first and second sharing processes in such a manner that, in response to reception of the sharing start instruction by the reception unit, the control unit waits for the communication apparatus to receive, from the other communication apparatus, a DPP signal compliant with the DPP standard and also waits for the communication apparatus to receive, from the other communication apparatus, another signal compliant with the other standard, wherein the communication apparatus executes the first process of sharing a communication parameter in a case where (i) among the DPP signal compliant with the DPP standard and the signal compliant with the other standard, the signal received from the other communication apparatus is the DPP signal compliant with the DPP standard, and (ii) an authentication by a public key is successful, and the communication apparatus executes the second process of sharing a communication parameter in a case where among the DPP signal compliant with the DPP standard and the signal compliant with the other standard, the signal received from the other communication apparatus is the second signal compliant with the other standard.

* * * * *